United States Patent [19]

Blum

[11] Patent Number: 4,929,865

[45] Date of Patent: May 29, 1990

[54] EYE COMFORT PANEL

[75] Inventor: Jerome V. Blum, Los Altos Hills, Calif.

[73] Assignee: Visual Ease, Inc., Los Altos Hills, Calif.

[21] Appl. No.: 321,632

[22] Filed: Mar. 9, 1989

Related U.S. Application Data

[63] Continuation-in-part of Ser. No. 8,514, Jan. 29, 1987, abandoned.

[51] Int. Cl.$^5$ .............................................. H01J 29/89
[52] U.S. Cl. ................................ 313/478; 350/276 R; 358/250
[58] Field of Search .............................. 313/478, 474; 350/276 R, 284; 358/250, 252, 253

[56] References Cited

U.S. PATENT DOCUMENTS 2,690,554  9/1954  Wolf .............................. 313/474 X
2,728,012 12/1955  Swedlund ....................... 313/478 X

OTHER PUBLICATIONS

Basic and Clinical Science Course, 1988-1989, Section 2, Optics, Refraction, and Contact Lenses, American Academy of Ophthalmology, pp. 1-296, 12/1988.

Primary Examiner—Kenneth Wieder
Attorney, Agent, or Firm—William B. Walker

[57] ABSTRACT

An eye comfort device for optically adjusting the focal distance for screen viewing of a video display comprising a transparent plate constituting a lens with a diopter vergence value in the range of from 0.4 to 0.8 diopters and preferably from 0.5 to 0.6 diopters. The plate contains a quantity of a UV absorbent rose, magenta or pink tint or colorant sufficient to block at least 80 percent of UV transmissions within the range of from 300 to 360 nm. The preferred plate composition is a substantially transparent organic polymer containing, in addition to the magenta tint, a quantity of a UV absorbent sufficient to block at least 90 percent of UV transmissions below 400 nm.

10 Claims, 1 Drawing Sheet

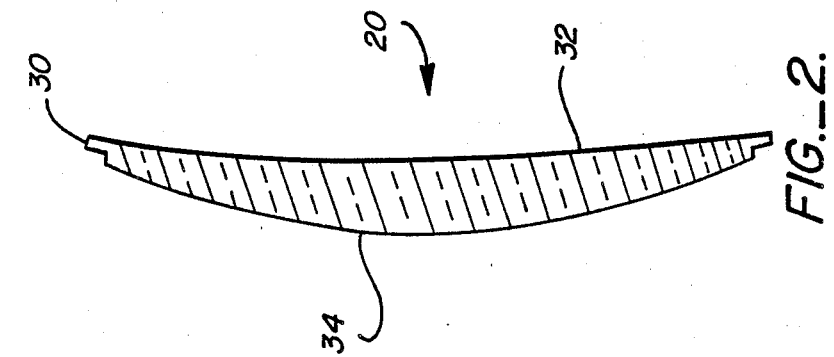
FIG._2.
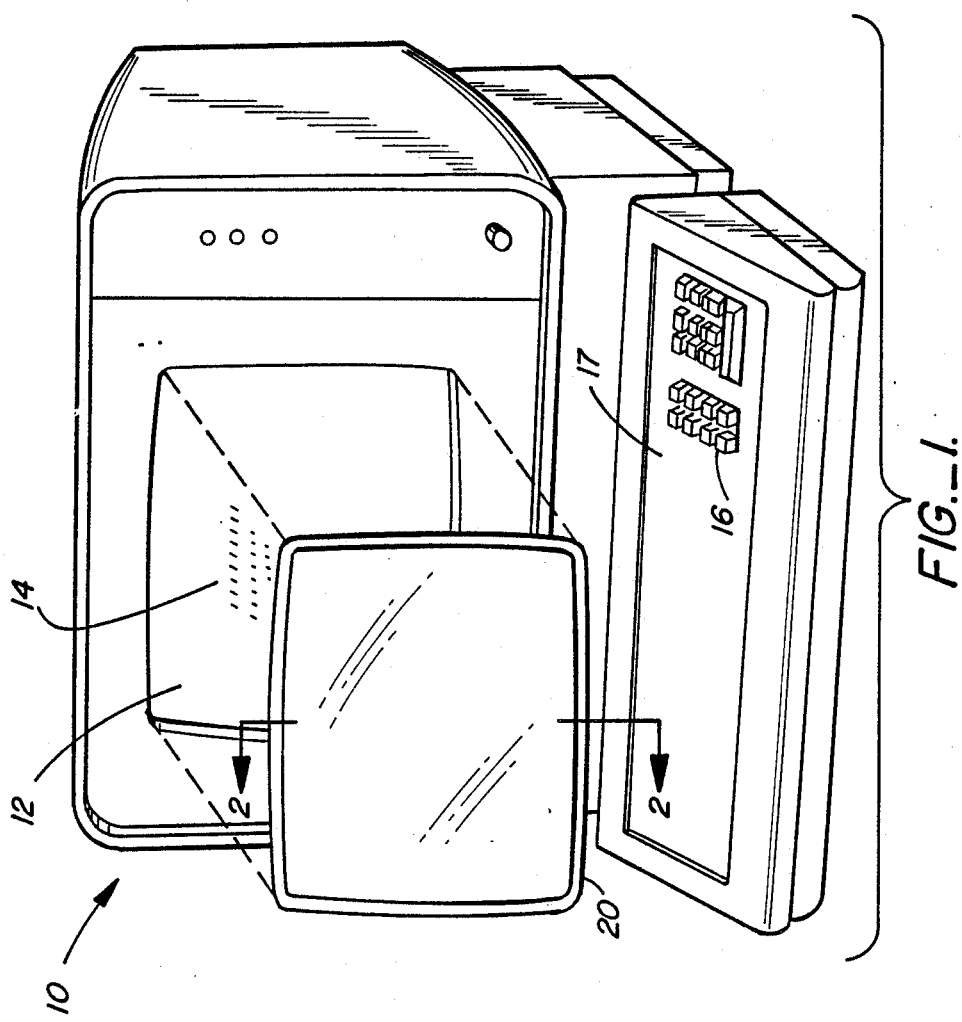
FIG._1.

EYE COMFORT PANEL

RELATIONSHIP TO COPENDING APPLICATION

This application is a continuation-in-part of copending application Ser. No. 07/008,514 filed Jan. 29, 1987, now abandoned.

FIELD OF THE INVENTION

This invention relates to an eye comfort panel or faceplate for a cathode ray tube computer terminal. In particular, the invention relates to a plate to be placed between the viewer and the cathode ray tube (CRT) screen or laminated to the surface of the CRT screen, which increases eye comfort of the user by reducing eye strain and eye irritation upon prolonged viewing of the screen.

BACKGROUND OF THE INVENTION

With the rapid expansion of computer operations into all aspects of business and government, many hundreds of thousands of people are involved in the operation of computer video display terminals. Many operators are positioned at the terminals during most of their working day, focusing on characters on the screen at a fixed focal distance, and exposed to the light radiating from the fluorescing pigments in the CRT screen. Increasingly, video display terminal operations are being linked to job-related stress and visual impairments.

Medical concern about the contribution of video display terminal use to eye impairment and stress is increasing. Although medical investigators, including the 1983 National Research Counsel Report, have produced no definitive evidence that prolonged video display terminal exposure produces ocular pathology, operators do suffer from certain ocular symptoms. Individuals at the workstation, especially after a stint of several hours, may have headaches, ocular pain, blurring, diplopia, congestion and ephiphora—otherwise known as the "VDT Syndrome".

I have found that the complaints, other than those derived from uncorrected refractive errors and eye muscle problems, can be traced to glare, light reflections, accommodative spasm and mental stress. The cornea, iris, lens and retina are sensitive to ultraviolet light (UV). The cornea is particularly susceptible to UV damage. Corneal epithelium may slough off and result in keratitic inflammation. With more severe exposure, iritis can occur. The human crystalline lens may have an increase in chromophole cells, leading to discoloration, and in the extreme, cataract formation. UV light can cause retinal irritation and/or damage, such as macula cyst or holes. Accommodative spasm is an overactivity of accommodation wherein the refractive power of the eye is increased and the patient experiences temporary myopia. The observer becomes temporarily nearsighted as the result of ciliary muscle spasm. It may be a response to fatigue. These symptoms can be induced and/or exaggerated by mental stress.

Although numerous legal judgments have been obtained on the basis of eye damage from VDT use, medical opinions about the long term damage potential of VDT use are divided. In the report "Video Displays, Work, and Vision" by the Panel on Impact of Video Viewing on Vision of Workers, Committee on Vision, Commission on Behavioral and Social Sciences and Education, National Research Council published by the National Academy Press, Washington, D.C. (1983) finding that radiation damage or serious diseases such as cataracts are not caused by VDT use, DR. 1. STARK, Professor of Physiological Optics and Engineering Science of the University of California, Berkeley (Appendix C) noted that ocular discomfort and visual fatigue beyond that appropriate for a normal workplace is indisputably related to VDT use. Although the ultraviolet (UV) radiation level emitted from CRT screens is generally believed to be below the level causing UV radiation damage to the ocular system, further research to identify the consequences of the UV radiation was recommended by Lerman, S. et al, "Ultraviolet Radiation Protection." 11(1):39–45 (1985).

This invention relates to a cover panel or faceplate which increases eye comfort of the user by filtering certain objectionable frequencies from the spectrum of light emitted by the screens and providing an optical adjustment of the focal distance for screen viewing of the viewer.

DESCRIPTION OF THE PRIOR ART

Most improvements of the video display terminals (VDT) and other cathode ray tube applications have focused on increasing image clarity or definition, contrast over background and ambient light reflections from the screen surfaces.

Reduction of reflected light by fusing silica sols to the glass surface is described in U.S. Pat. No. 3,940,511. Woven mesh elements which reduce incident light reflection are described in U.S. Pat. Nos. 2,977,412 and 4,253,737.

A variety of filters have been devised to modify the light transmissions from the screens. The construction of television and color CRT screens using pigments which improve color are described in U.S. Pat. No. 4,217,520. Use of pigments to absorb or modulate ambient light interference is described in U.S. Pat. Nos. 3,511,560, 3,582,189, 3,760,215 and 4,392,077.

Pink tints have been used in lenses and goggles to reduce UV transmissions.

SUMMARY OF THE INVENTION

This invention is an eye comfort device for optically adjusting the focal distance for screen viewing of a video display comprising a transparent plate constituting a lens with a diopter vergence value in the range of from 0.4 to 0.8 diopters and preferably from 0.5 to 0.6 diopters. The plate contains a quantity of a UV absorbent rose, magenta or pink tint or colorant sufficient to block at least 80 percent of UV transmissions within the range of from 300 to 360 nm.

The preferred plate composition is a substantially transparent organic polymer containing, in addition to the magenta tint, a quantity of a UV absorbent sufficient to block at least 90 percent of UV transmissions below 400 nm.

BRIEF DESCRIPTION OF THE DRAWINGS

FIG. 1 is a perspective view of the keyboard display terminal showing my eye comfort device.

FIG. 2 is a cross-sectional view of the eye comfort device shown in FIG. 1.

DETAILED DESCRIPTION OF THE INVENTION

In the common use of computer terminals, a keyboard operator keys in data, and the characters input, as well as character or other output is displayed on the screen. The surface of the CRT tube is normally glass or other reflective material. Reading characters displayed on a screen with a high level of ambient reflection causes eye fatigue. Various filters and screens have been tried to reduce the ambient glare to a more comfortable level. However, eye fatigue has persisted. I have determined that this fatigue is due to a combination of eye irritation from certain frequencies of light transmitted by the CRT screen and to fatigue of the medial rectus internal eye muscle caused by prolonged focus on the screen surface displaying the characters.

FIG. 1 is a perspective view of a customary display terminal showing the eye comfort panel or detachable screen plate embodiment of my invention. The computer terminal 10 has a cathode ray tube 12 on which characters, lines and shapes 14 are displayed in illuminated numbers, symbols, letters and shapes representing input data and/or feedback. The data is input with standard keys 16 of a keyboard 17. The operator is positioned in front of the display screen 12, positioned at an unvarying distance from the screen surface.

My eye comfort device can be a detachable screen 20 dimensioned to fit over the face of the CRT screen 12, supported by a flat surface or retention groove 22 in the screen housing 24. Alternatively, the screen 20 can be a faceplate or other panel permanently adhered to the outermost surface of the CRT tube, a safety panel thereon or an intermediate layer in a CRT faceplate laminate. All of these embodiments are intended to be included in the term "plate" as used herein.

FIG. 2 is a cross-sectional view of the eye comfort device shown in FIG. 1. The eye comfort screen or plate 20 has an outer edge 30 and a back face 32 which is preferably shaped to conform to the curvature of the front surface of the viewing surface 12 of the device. The front surface 34 of the plate 20 is curved and forms a convex lens having a power or vergence of from 0.4 to 0.8 diopters and preferably from 0.5 to 0.6 diopters.

The screen or plate 20 can be any transparent material with light transmissions of at least 90 percent. The materials can be glass or transparent organic polymers. Suitable glasses include routine soda-lime silicate glasses, photochromic glasses such as borosilicate glasses and the like. Suitable transparent organic polymers include acrylic polymers and copolymers (e.g., LUCITE, Du Pont; PLEXIGLAS, Rohm & Haas), acrylonitrile-methyl acrylate copolymers (e.g., BAREX 210, Vistron), polycarbonates (e.g., LEXAN, General Electric; MERION, Mobay Chemical; and TUFFAK, Rohm & Haas), and allyl diglycol carbonates (CR-39). Other transparent thermosetting and thermoplastic polymers can also be used.

The plastic screen contains a UV absorbing material and a pigment or dye which has a pink, rose or magenta coloration. The amount of UV absorbent in the plastic is sufficient to block at least 80 percent and preferably 90 percent of UV radiation within the frequencies of 300 to 400 nm. The amount of absorbent required will depend upon the choice of pigment or dye and its absorbency properties. Any UV absorbing material soluble or dispersible in the plastic precursors which does not significantly impair the transparency of the plastic can be used. Examples of suitable UV absorbing materials which can be used are CYAPORT (American Cyanamid), and UNIVEL D36, D38 AND D40 (Dow Chemical).

The magenta or pink pigment or dye can be any absorbent which preferentially transmits light having the frequencies corresponding to a pink or magenta color, preferably from 380 to 520 nm and optimally from 390 to 470 nm, but without significantly reducing the transparency of the plastic or the definition of the characters on the screen. The preferred pink or magenta pigments or tints block at least 80 percent of UV transmissions within the range of from 300 to 360 nm. The amount of pigment or dye incorporated in the screen 20 should be sufficient to provide increased eye comfort. Any amount has a beneficial effect. The preferred amounts should be sufficient to reduce light transmission outside the pink or magenta frequencies at least 20 percent and preferably at least 40 percent. Optimally the amount should reduce light transmission (outside the pink or magenta frequencies) at least 55 percent. Examples of magenta or pink pigments or dyes which are suitable absorbing materials for use are Pink #4 (ECONO TINT), and Rose #1 (Tint 1, Tint 2, Tint 3, Tint 4 and Grn 1)

A most preferred eye comfort screen is made of polymethylacrylate or polycarbonate having a surface curvature forming a lens having a vergence or power of 0.4 to 0.8 diopters and containing from 0.05 to 1.0 weight percent of a UV absorbent and from 0.1 to 0.5 weight percent of a magenta pigment or dye.

I claim:

1. An eye comfort device for optically adjusting the focal distance for screen viewing of a video display comprising a transparent plate constituting a lens with a diopter vergence value in the range of from 0.4 to 0.8 diopters.

2. The eye comfort device of claim 1 wherein the plate has dispersed therein, a quantity of a UV absorbent sufficient to block at least 80 percent of UV transmissions through the plate having a wavelength of from 300 to 400 nm.

3. The eye comfort device of claim 2 wherein the UV absorbent blocks transmission of at least 90 percent of light having a wavelength of from 300 to 400 nm.

4. The eye comfort device of claim 1 wherein the plate has dispersed therein, a quantity of pink colorant sufficient to provide increased eye comfort.

5. The eye comfort device of claim 4 wherein the pink colorant blocks transmission of at least 80 percent of light having a wavelength of from 300 to 360 nm.

6. The eye comfort device of claim 1 wherein the plate is made of a transparent organic polymer.

7. The eye comfort device of claim 6 wherein the plate is made of an acrylate or methacrylate homopolymer or copolymer, or a polycarbonate.

8. The eye comfort device of claim 1 wherein the vergence value of the lens is from 0.5 to 0.6 diopters.

9. The eye comfort device of claim 1 wherein the plate is made of a transparent organic polymer having a UV absorbent and a pink colorant dispersed therein, the quantity of the UV absorbent being sufficient to block transmission of at least 90 percent of light having a wavelength of from 300 to 400 nm, and the quantity of the pink colorant being sufficient to block transmission of at least 80 percent of light having a wavelength of from 300 to 360 nm.

10. The eye comfort device of claim 9 wherein the vergence value of the lens is from 0.5 to 0.6 diopters.

* * * * *